Patented Jan. 2, 1951

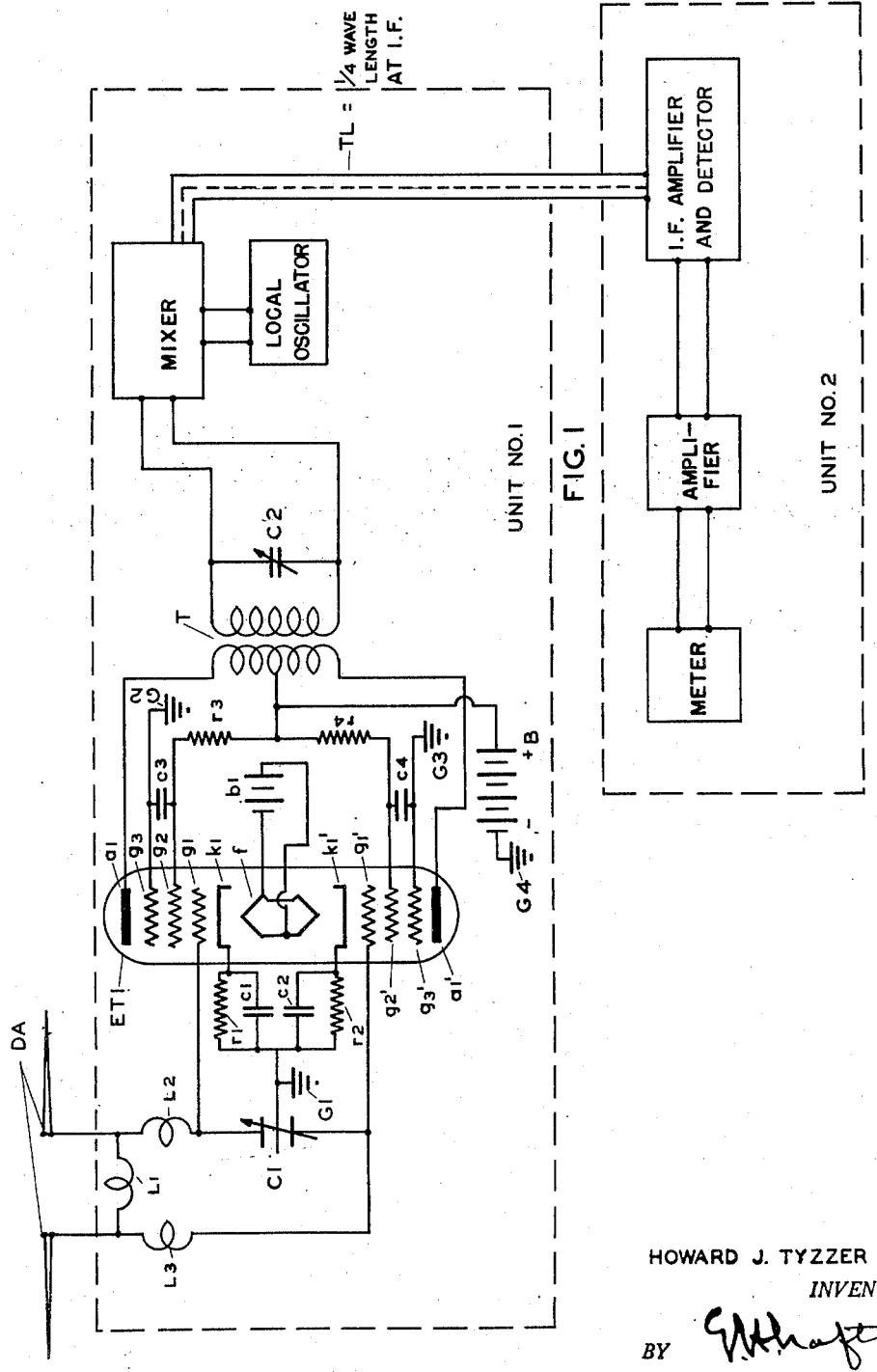

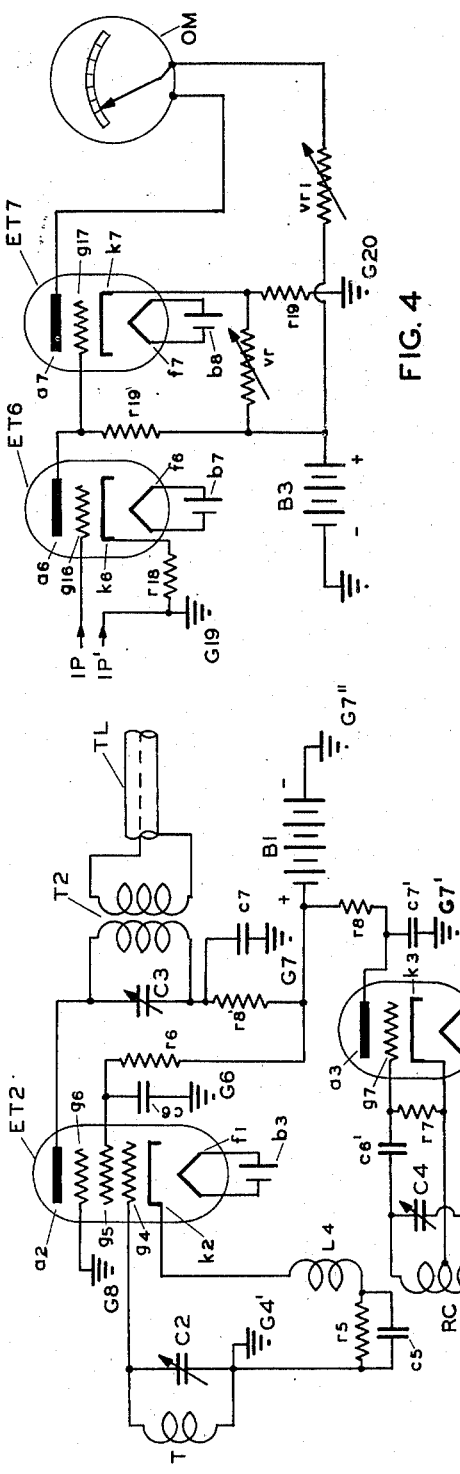
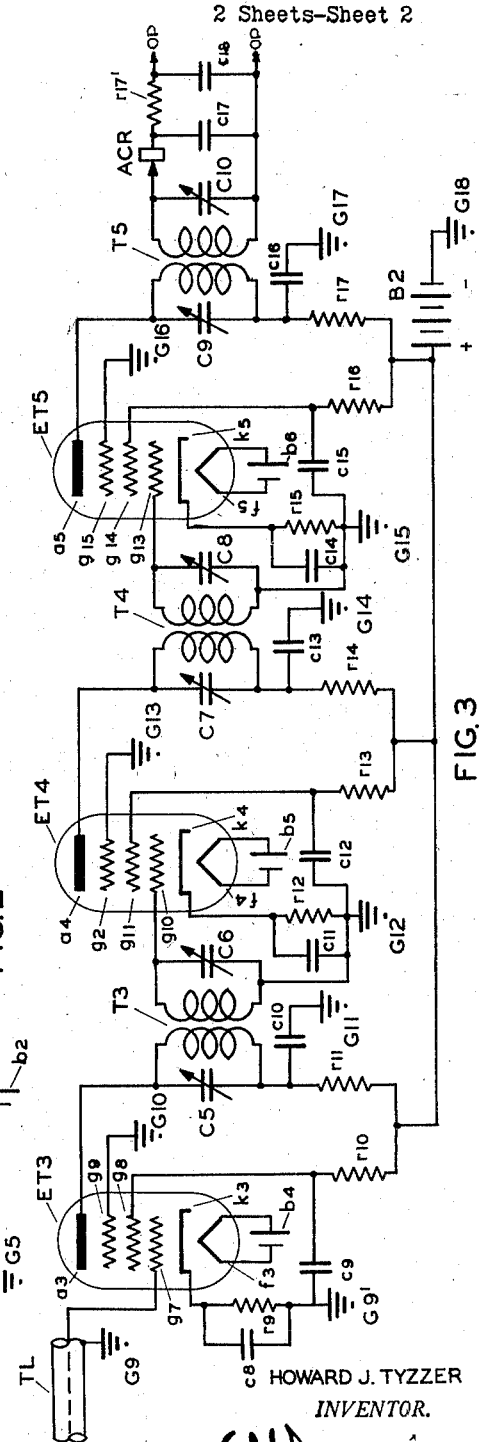

2,536,329

UNITED STATES PATENT OFFICE 2,536,329

APPARATUS FOR RECEIVING ELECTRICAL ALTERNATING FIELD EFFECTS

Howard J. Tyzzer, Mountain Lakes, N. J., assignor to Ferris Instrument Laboratories, Boonton, N. J., a corporation of New Jersey Application November 23, 1946, Serial No. 711,872

9 Claims. (Cl. 250—1)

1

My present invention broadly relates to means for effectively intercepting and receiving components of electrical alternating field effects and effectively indicating the relative intensities of the same when received, the primary purpose of which is to find when and/or where there exists in space electrical alternating field effects having spurious sources and such attributes as to be potential and/or actual interferers with effectively intercepting, receiving and registering alternating electrical effects for useful purposes, such as electrical communications including radio, radar and television practices as outstanding examples. However, said primary purpose is not intended to exclude the matter of using my present invention for determining to what extent or extents the alternating electrical field effects of useful services depending upon the same may be causing objectionable interference or interferences with other services depending upon other alternating electrical field effects of fixed and/or predetermined characteristics.

It is now common knowledge that those sufficiently acquainted with the particular art are greatly impressed by the extents to which different kinds of electrical communications services have been increased by workers in the art during the past ten years along with the extents to which some of these services have been successfully made to depend upon working at frequencies many times higher than those priorly employed and/or potentially contemplated.

It has always been recognized in the art of electrical communications since they began to rapidly grow in use that alternating electrical field effects from both natural and artificial (whether intentional or unintentional) sources could have the power and necessary attributes for seriously interfering with any and all purposeful, controlled alternating electrical field effects communications. The provisions of means with which to effectively determine at what frequencies and intensities different alternating electrical field effects exist at any location at the same or different times is the principal object of my present invention.

A subsidiary object of my present invention is the one of making the means relied upon for said purposes more efficient and effective in performing than would otherwise be the case by taking advantage of certain simple to introduce rearrangements and adjustments of the means necessary to bring about performing in the manner involved.

A second subsidiary object of my present invention is the one of widely extending the range and height of frequencies at which the means involved are effective at the higher efficiencies made possible by my present invention.

A third subsidiary but preferable only object of my present invention is the one of making the means involved of a form that the same is to all intents and purposes satisfactorily portable and workable from its associated power supply means in order that the same can be caused to effectively work and be put to use for the purposes for which intended wherever it may be desired to investigate alternating electrical field effects known or believed to exist, or to determine whether or not such do exist.

As is generally the case, potentially there are other objects of my present invention of probable lesser importance than those specifically set forth herein that, it is believed, will be readily apparent to those skilled in the art involved as its description is hereinafter taken up and carried out more or less in detail with the aid of references to the accompanying drawings in which like reference symbols to a considerable extent refer to like in kind and/or function parts.

Briefly stated, the respective figures of the drawings may be identified as follows:

Fig. 1 schematically illustrates, partially more or less in detail and partially in the form of marked blocks, all of the various steps of associated means essential to practicing the primary object of my present invention, and suggests that the same be assembled as two separate units, Nos. 1 and 2.

Fig. 2 schematically illustrates more or less in detail what the blocks of Fig. 1 marked ETM and ETR are intended to embody.

Fig. 3 schematically illustrates more or less in detail what the divided block of Fig. 1 marked ETA and ETD is intended to embody.

Fig. 4 schematically illustrates more or less in detail what the blocks of Fig. 1 marked DCA and OM are intended to embody.

Referring to the details of Fig. 1, in general they schematically illustrate an electronic tube and associated circuits called a balanced amplifier because of its making use of like oppositely disposed elements of electronic tube ETI coupled in the same way, primarily assembled to be effective for amplifying at very high frequencies and shown to have its input circuit arranged to be fed from an intercepting antenna DA. Since amplifying electrical alternating currents having frequencies of the order of as high as 500 megacycles is no longer an exception to the rule, in my case of so-called troubleshooting for interfering electrical alternating field effects of any and all possible frequencies, it is all important to assemble said balanced amplifier with the greatest of care and know-how for assuring reliable amplification at such high frequencies even though it is axiomatic that the same is more reliable for such work than is an ordinary unbalanced amplifier.

In the matter of the dipole type of intercepting antenna DA shown, I prefer to use the same because of its inherent directional attribute making it possible to learn something about the directions from which sought for and found interferences come while at the same time lessening the interference effect or effects on the investigations originating in interfering effect or effects coming from another or other directions which otherwise might interfere with attaining the best obtainable data concerning interfering effects under investigation.

For otherwise isolating interference effects under intentional investigation, antenna DA is shown associated with a tunable circuit having the three indicated fixed inductance elements L1, L2 and L3 and variable tuning condenser C1 connected across the shown control grids (nearest the indicated cathodes k1 and k1') g1 and g1' of indicated tube ET1, shown as being of the so-called screen grid and suppressor grid type due to the additionally shown grids g2, g2', g3 and g3'; as a result of which, in the absence of any other interfering effects of the same or very closely the same frequency (rarely the case), the desired said isolation is most effectively attained during tuning-in operations.

In connection with the input phase of my said investigating means, I have found that by dividing the total inductance required by the tunable input circuit involved into three elements substantially coequal in inductance (L1, L2 and L3) and locating them one in each lead to said antenna and one across the same, as shown, materially higher than usual input impedance, with consequential higher voltage, is attained at all of the frequencies involved than would otherwise be the case to make for all around materially higher efficiency of reception up to said control grids g1 and g1', with consequential higher amplified output of said balanced amplifier deliverable to the tunable input circuit T—C2 of the next in line step indicated by the block labeled "Mixer."

Due to the material extents to which the impedance presented to electrical alternating field effects of materially different frequencies by such a dipole (also referred to as "balanced") antenna varies to consequently equivalently vary efficiency in using the same in such cases, when they have been such that the results sought would be materially impaired thereby, it has generally been the practice to vary the length of each pole of said type of antenna for each material change of frequency enough to keep said impedance as nearly the same as possible, but the extent to which such can be done under practical conditions being quite limited, I have found that the exceptionally wide scope in frequencies involved in the troubleshooting in which I am particularly interested calls for the much more practical alternative I have discovered and described in the next above paragraph. Of course, in extreme cases of exceptionally wide frequency differences, use of both expedients potentially offers a more thorough solution.

Referring further to Fig. 1 with respect to the more or less in detail part of the same; indicated condensers c1 and c2 and resistances r1 and r2, respectively, function for developing the usual control grid biasing; indicated grounds G1, G2, G3 and G4 function for the usual grounding purposes; indicated filament f and battery b1 function for the usual cathode heating purpose; indicated cathodes k1 and k1' function for the usual electron emitting purpose; indicated battery B functions for making the potentials of anodes a1 and a1' and screen grids g2 and g2' positive; indicated condensers c3 and c4 function for the usual by-pass purpose; indicated resistances r3 and r4 function for the usual lesening of screen grid potential below that of anode; and transformer T functions for the usual energy transfer purpose.

Referring to Fig. 2 for its showing of details unshown by the blocks labelled "Mixer" and "Local Oscillator" of Fig. 1; broadly considered, the combination of said blocks has for its purpose effectively modulating the amplified alternating electrical field effects transferred from said balanced amplifier to the input of the mixer by alternating electrical effects generated by means embodied in the local oscillator of a frequency such that the difference in frequency therebetween due to said modulating will always be of a definite predetermined amount, commonly known as "intermediate" in so-called superheterodyne operations; as a result of which, irrespective of the frequency of anything received and amplified by electronic tube ET1 and associated circuits, indicated cable TL will have transferred to it a sample of the same at the intermediate frequency thereby set up.

As shown, coil RC of the schematically illustrated electronic tube oscillator and its associated circuits is coupled with coil L4 shown in the input circuit associated with indicated tube ET2. Consequently, there results in this circuit modulation of the incoming electrical alternating effects at a frequency differing from the frequency of said effects the right amount to make a beat frequency therebetween equal to said predetermined intermediate frequency, to which associated circuit containing condenser C3 and transformer T2 is intentionally tuned. As to this operation, I prefer to make said intermediate frequency high enough to be well above audibility.

Referring further to Fig. 2 for more details; the indicated resistance r5-condenser c5 and resistance r7-condenser c6' combinations function to develop the usual biasing for indicated grids g4 and g7, respectively; indicated filament f2-battery b3 and filament f3-battery b2 combinations function to heat to electron emissivity indicated cathodes k2 and k3, respectively; indicated grounds G4', G5, G6, G7, G7', G7'' and G8 function to provide the usual grounding; indicated condensers c6, c7 and c8 function as the usual by-pass elements; indicated anodes a2 and a3 in combination with indicated battery B1 function as the usual positive electron attracting electrodes; indicated grids g4 and g5 function as the usual tube stabilizers; and indicated resistance r6, r8 and r8' function as the usual battery B1 potential reducers. The indicated concentric cable TL will be discussed following description of Fig. 3.

Referring to Fig. 3 for its showing of details unshown by the block labelled "I. F. Amplifier and Detector," broadly considered the combination has to do with three stages of cascaded amplification for considerably amplifying said intermediate frequency electrical alternating effects followed by a stage of effective rectification and filtration for the same.

In more or less detail, Fig. 3 shows three duplicate electronic tubes ET3, ET4 and ET5 in the order given; indicated filaments and batteries f3, b4, f4, b5 and f5—b6 combinations function for heated indicated cathodes k3, k4 and k5, respectively, to the usual electron emitting temperature; indicated grids g7, g10 and g13, adjacent said cathodes, function as the usual control grids, respectively; indicated grids g8, g11 and g14 function as the usual screen-grids of such tubes; indicated grids g9, g12 and g15 function as the usual so-called suppressor grids of such tubes; indicated anodes a3, a4 and a5 function, in combination with indicated battery B2, as the usual positive electron attracting electrodes of such tubes; indicated grounds G9, G9', G10, G11, G12, G13, G14, G15, G16, G17 and G18 function for the usual grounding purposes; indicated resistance r9-condenser c8, resistance r12-condenser c11 and resistance r15-condenser c14 combinations function for developing the usual grid biasing potentials of their respective tubes; indicated condensers c9, c10, c12, c13, c15 and c16 function as the usual by-pass elements; and indicated resistances r10, r11, r13, r14, r16 and r17 function as the usual battery B2 potential limiting elements.

Fig. 3 further shows that the fixed, predetermined intermediate frequency electrical alternating effects are transmitted to the input of the mixer of Fig. 1 through indicated 2-conductor concentric cable TL; and I have found that by giving this cable a physical length substantially the coequal of substantially what the physical spread of one-quarter of the wave length of said intermediate, predetermined frequency alternating effects is, there results an amplification factor of the order of ten working on said intermediate frequency alternating effects between input to and output from said cable.

Although said cable is shown by Fig. 1 as stretching out to its full length between the mixer and I. F. amplifier. I have further found that if desired it may be housed in coil form, as within either the housing of unit No. 1 or unit No. 2 without at all impairing its ability to act to bring about said special amplification that I have found takes place therein.

In the indicated tunable circuits C5—T3, C6—T3, C7—T4, C8—T4, C9—T5 and C10—T5 shown by it, Fig. 3 clearly indicates that the 3-stage amplifier shown is exceptionally well equipped for closely confining its considerable amplification involved to those alternating electrical effects reduced to said predetermined, intermediate frequency.

Fig. 3 additionally shows means for effectively rectifying said predetermined, intermediate frequency electrical alternating effects in the indicated rectifying means ACR and acting towards perfecting said rectifying by the indicated filtering means formed by resistance r17' and condensers c17 and c18.

Referring to Fig. 4 for its showing of details unshown by blocks labelled "Amplifier" and "Meter" of Fig. 1, broadly considered the former functions to amplify the rectified components of said predetermined, intermediate frequency effects by the indicated 2-stage electronic tube and associated circuits amplifier shown; and the latter is caused to function preferably as a decibel meter for indicating the intensity of any electrical alternating field effects investigated after taking into consideration the total amount of amplification brought to bear.

As shown, indicated input terminals IP and IP' function to permit of impressing the rectified components of said predetermined, intermediate frequency effects on the input of said final amplifier; indicated electronic tubes ET6 and ET7 are shown as being substantially duplicates of each other and of fewer electrodes than tubes shown elsewhere because for the rectified effects on which they operate no extra electrodes are needed to assure stability of operation; indicated filament f6-battery b7 and f7-battery b8 combinations function to heat indicated cathodes k6 and k7, respectively, to electron emitting temperature; indicated grids g16 and g17 function as control grids; indicated anodes a6 and a7 in association with indicated battery B3 function to provide the positive electron attracting electrodes of the respective tubes; indicated resistance r18 functions to develop biasing potential for grid g17; indicated resistance r19' functions as a coupling between the shown tubes; indicated variable resistance vr functions to control amplification; and indicated variable resistance vr1 functions to control final output action on indicated output meter.

I have found that division of the total required means for carrying out the investigations in which I am particularly interested into two separate units has the advantages of facilitating best laying the same out for transportation to thereby make the same well suited for the very important matter of portability plus making it possible to fixedly mount dipole antenna on unit No. 1 which can itself readily be rotated to set the horizontal poles of said antenna in any desired direction. However, this breakdown into two units is merely a preferred embodiment of my present invention from the point of view of fittedness for portability.

It is axiomatic that electronic tube and associated circuits amplifiers are not any where near uniformly efficient at all of the frequencies to which they may be made responsive for any one of the usual assemblies. Consequently, I find that by arranging my particular means so that in spite of being able to make the interference investigations I herein describe over an exceptionally wide range of different frequencies, due to attaining nearly all of the amplification sought before final rectification at a single frequency beginning with my one-quarter wave length cable TL, I am able to approach uniform efficiency much more closely than usual.

While I have described my present invention in certain confined respects, it is apparent that modifications may be made and that no limitations are intended other than those imposed by the scope of the appended claims.

What I claim as new, and desire to secure by Letters Patent of the United States is as follows:

1. In a receiver for electrical alternating field effects and indicator for the intensity of said effects specifically designed to intercept and receive those of said effects alternating at frequencies above audibility: the combination of an elevated effective interceptor of said effects; an amplifier having an electronic tube and associated circuits specially adapted to amplify said effects and having an input circuit tunable to the frequency of said effects which input circuit has an inductance component divided into three sections substantially coequal in inductance value, said interceptor being directly connected across the middle one of said sections; an electronic tube and associated circuit having an input circuit tunable in syntony with the input circuit of said amplifier and having an output circuit fixedly tuned to a predetermined frequency above audibility and less than the lowest frequency of said alternating effects desired to be received by an amount not less than said fixed predetermined frequency of said fixed input circuit; an electronic tube generator of electrical alternating currents of variable frequencies differing from the frequencies of said electrical alternating effects desired to be received by an amount equal to said fixed frequency, said generator being coupled to one of the circuits associated with said second named electronic tube; a two conductor cable of a length subsbtantially equal to one quarter of the wave length of said fixed predetermind frequency coupled to the output circuit of said second named electronic tube for receiving therefrom energy of said fixed predetermined frequency; a multistage amplifier comprising electronic tubes and associated circuits for directly receiving effects of said fixed predetermined frequency from said sable and for effectively amplifying said latter effects at said fixed frequency; a rectifier and filtering means associated therewith for receiving said latter effects from said last named amplifier; an amplifier having an electronic tube and associated circuits for receiving and amplifying said rectified effects; and a meter coupled to the output circuit of said last named amplifier for indicating the intensity of the output of said latter amplifier.

2. The combination of claim 1 in which said elevated interceptor is a dipole antenna.

3. The combination of claim 1 in which said elevated interceptor is a dipole antenna adjustably mounted for directionally receiving from different directions.

4. The combination of claim 1 in which said two conductor cable is of concentric form.

5. The combination of claim 1 in which said two conductor cable is in the form of a housed coil.

6. The combination of claim 1 in which said output meter is calibrated to read in decibels.

7. In a system for amplifying electrical alternating effects after their conversion to a lower frequency than that originally had; the combination of a source of said converted effects; a two conductor cable having an electrical length substantially equal to one quarter of the wave length corresponding to said lower frequency effects, said cable being coupled to said source to receive said effects therefrom; a multistage amplifier adapted to receive said lower frequency effects from said cable and to amplify the same at said lower frequency; said amplifier having an electron tube with input electrodes connected directly to said cable; and means for utilizing the said effects after amplification thereof including a circuit tuned to said lower frequency.

8. In a system for amplifying alternating electrical effects: the combination of an electronic amplifier tuned to effectively amplify at a fixed predetermined frequency, a two conductor cable having a physical length substantially equal to one quarter of the wave length corresponding to said frequency, said cable being coupled directly to the input electrodes of said amplifier to apply the full voltage of said cable to said amplifier input.

9. A superheterodyne receiving system comprising a frequency converting stage for converting the input wave to an intermediate frequency, and an intermediate frequency utilization stage, said stages being intercoupled by a two conductor cable having a physical length substantially equal to a quarter of the wave length corresponding to said intermediate frequency, and said latter stage having an electron tube with input electrodes coupled directly to said cable to have the full voltage of said cable applied to said electrodes, whereby effectively increased amplification of the signal input to said receiver may be obtained.

HOWARD J. TYZZER.

REFERENCES CITED

The following references are of record in the file of this patent:

UNITED STATES PATENTS

| Number | Name | Date |
|---|---|---|
| 1,785,297 | Cohen | Dec. 16, 1930 |
| 1,811,357 | Karplus | June 23, 1931 |
| 2,039,107 | Nichols et al. | Apr. 28, 1936 |
| 2,074,896 | Earnshaw | Mar. 23, 1937 |
| 2,264,718 | Rust et al. | Dec. 2, 1941 |
| 2,267,445 | Cork et al. | Dec. 23, 1941 |
| 2,295,629 | Bond | Sept. 15, 1942 |
| 2,312,211 | De Cola | Feb. 23, 1943 |
| 2,360,475 | Chatterjea et al. | Oct. 17, 1944 |
| 2,428,300 | Stott | Sept. 30, 1947 |
| 2,438,116 | Dodds et al. | Mar. 23, 1948 |

FOREIGN PATENTS

| Number | Country | Date |
|---|---|---|
| 502,722 | Great Britain | Mar. 22, 1939 |
| 426,011 | Great Britain | Mar. 26, 1935 |
| 704,970 | Germany | Apr. 12, 1941 |